United States Patent [19]

Traugh

[11] 4,392,597
[45] Jul. 12, 1983

[54] BICYCLE RACK

[76] Inventor: Hubert L. Traugh, 307 E. Exchange, Owosso, Mich. 48867

[21] Appl. No.: 345,199

[22] Filed: Feb. 2, 1980

Related U.S. Application Data

[63] Continuation-in-part of Ser. No. 279,717, Jul. 2, 1981, abandoned.

[51] Int. Cl.³ .............................................. B60R 19/02
[52] U.S. Cl. .......................... 224/42.13; 224/42.03 B; 224/42.06
[58] Field of Search ...................... 224/42.13, 42.03 B, 224/42.06

[56] References Cited

U.S. PATENT DOCUMENTS

| | | | |
|---|---|---|---|
| 1,809,119 | 6/1931 | Haffke | 224/42.13 |
| 3,225,986 | 12/1965 | Anderson | 224/42.03 B |
| 3,800,967 | 4/1974 | Kosecoff | 224/42.03 B X |
| 3,877,622 | 4/1975 | McLain | 224/42.03 B |
| 3,972,457 | 8/1976 | Kesler | 224/42.13 X |
| 4,189,074 | 2/1980 | Davies | 224/42.06 |
| 4,299,341 | 11/1981 | Copeland | 224/42.03 B |

Primary Examiner—Steven M. Pollard
Attorney, Agent, or Firm—Malcolm R. McKinnon

[57] ABSTRACT

A bicycle rack particularly adapted for use in combination with an externally mounted spare tire on a vehicle, such as a recreational, motor home, or van type vehicle, the rack incorporating means for releasably mounting the rack on the spare tire without requiring the use of tools and means for releasably supporting one or more bicycles on the rack with the bicycles in a fully assembled condition.

22 Claims, 12 Drawing Figures

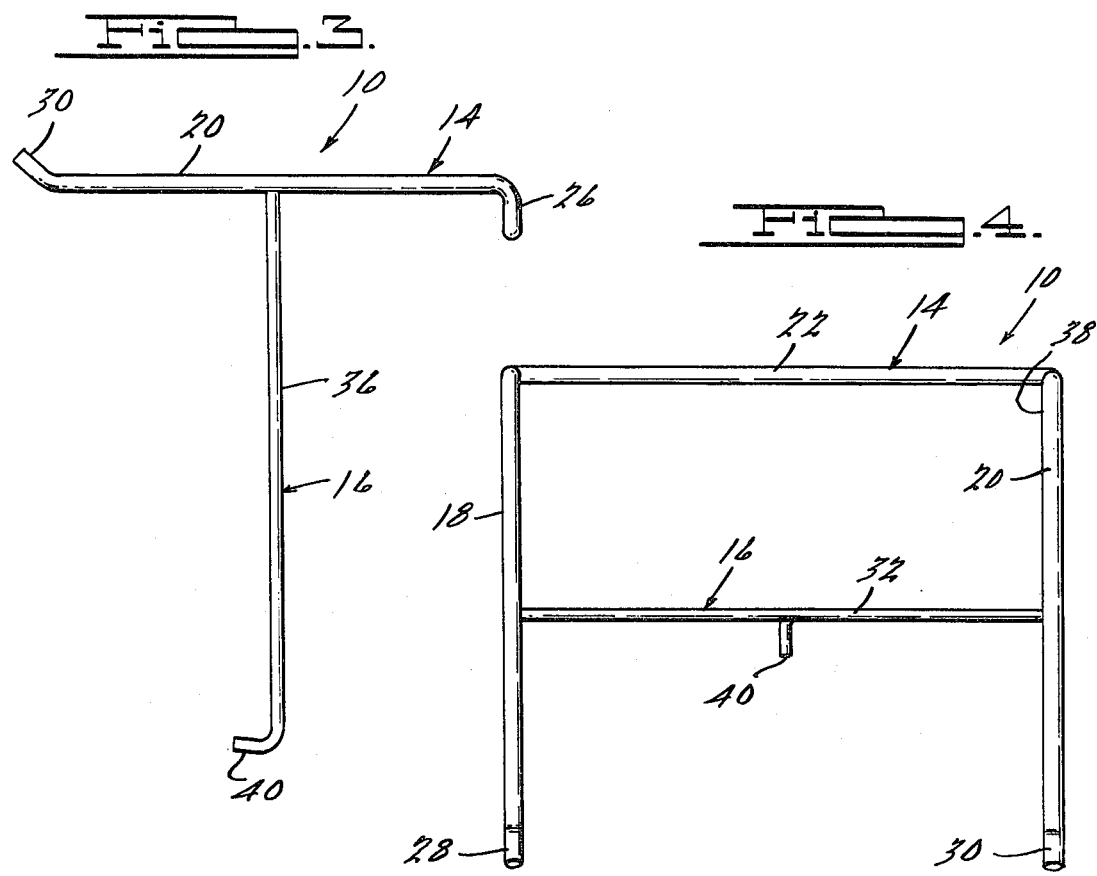

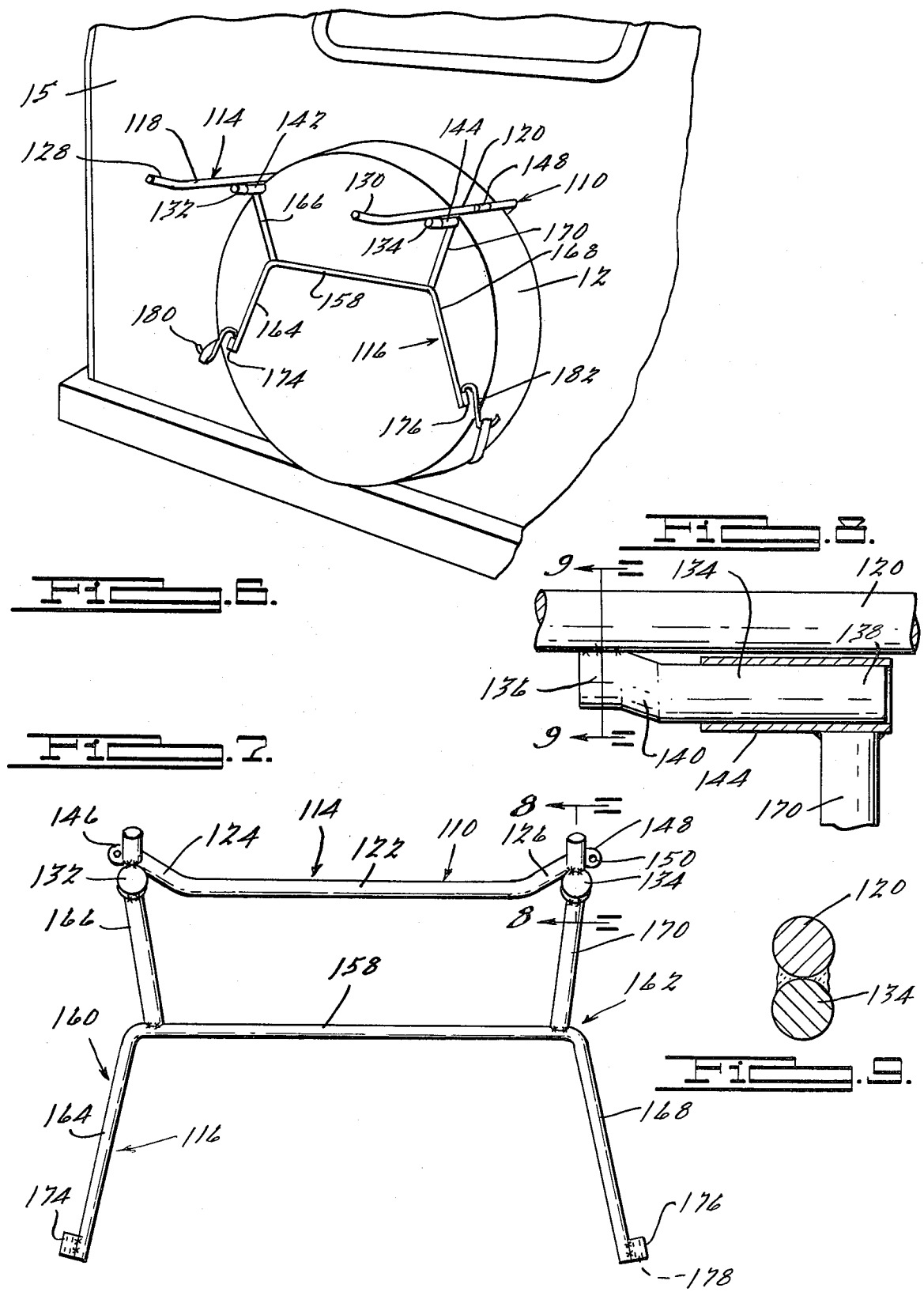

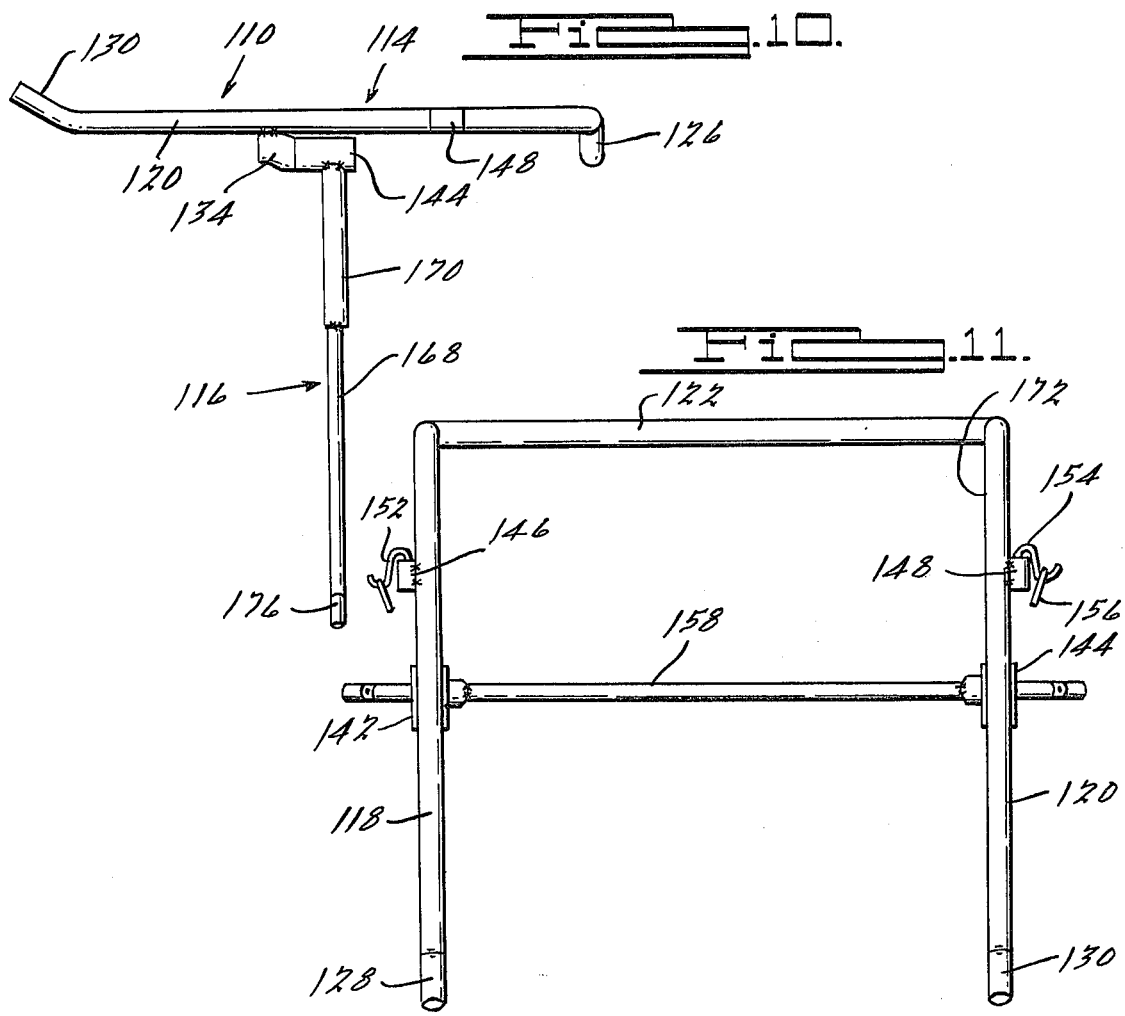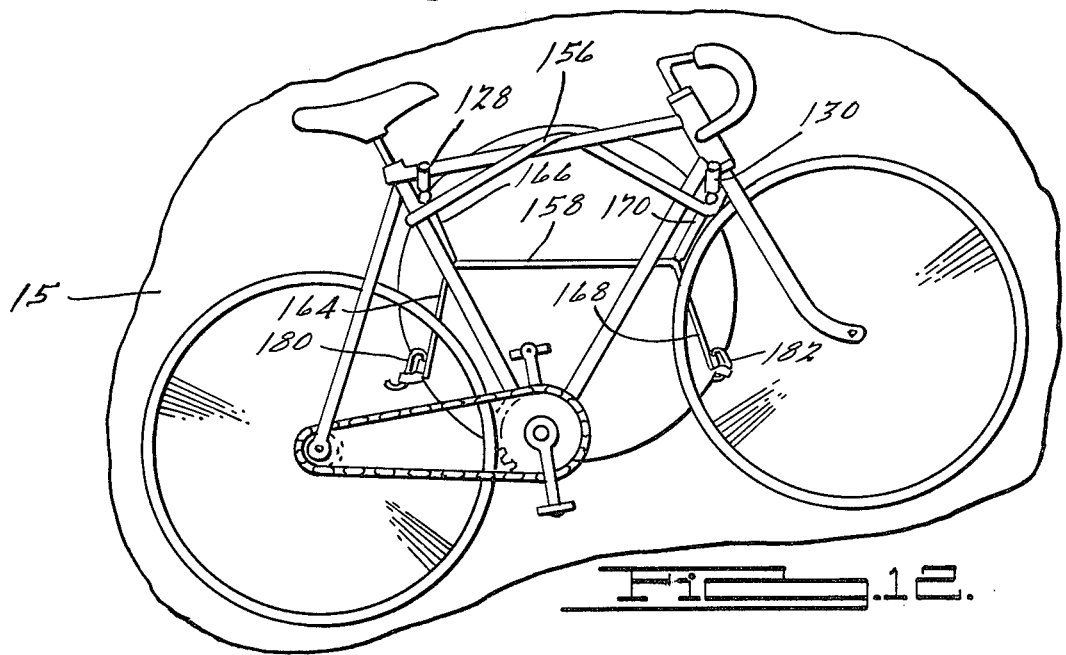

BICYCLE RACK

BRIEF SUMMARY OF THE INVENTION

This application is a continuation-in-part of the applicant's co-pending application, Ser. No. 06/279,717, filed July 2, 1981, for Bicycle Rack, now abandoned.

This invention relates to bicycle racks, and, more particularly, to an improved bicycle rack particularly adapted for use in combination with an exteriorly mounted spare tire on a vehicle whereby one or more bicycles may be transported in a fully assembled condition by the vehicle. Bicycle racks embodying the present invention have particular utility in mounting bicycles on exteriorly mounted spare tires such as are commonly employed on recreational vehicles, motor homes, van type vehicles and other vehicles, although it will be understood that the present invention is applicable to other uses.

Heretofore various bicycle racks have been provided for mounting bicycles on automotive vehicles for bicycle transportation purposes. For example, it has been a common practice to provide bicycle carriers which are adapted to be secured to the front or rear bumpers of the automotive vehicles. U.S. Pat. No. 2,379,994 discloses such a bumper mounted bicycle carrier. It has also been a common practice to mount bicycles on racks secured to the roofs of automotive vehicles, the racks supporting the bicycles in either a horizontal or vertical position. However, prior bicycle racks of the indicated character are subject to a number of deficiencies. For example, bicycles mounted on carriers secured to the front bumper of a vehicle often tend to block or diminish the light emanating from the headlights of the associated vehicle and bumper mounted carriers often cannot be mounted on the rear bumper of recreational, motor home, van type and other vehicles because of exteriorly mounted spare tires which interfere with and obstruct mounting of the carriers and bicycles. In addition, it is awkward and difficult to secure bicycles to racks which are mounted on the roofs of vehicles, and racks which support the bicycles in an upright or vertical position on the roofs of the vehicles often generate clearance problems which may be presented by low hanging branches of trees encountered in residential areas or on rural roads. Moreover, prior bicycle carriers of the indicated character are often relatively expensive, burdensome to install on or remove from the associated vehicles, and usually require the use of tools to effect installation and removal.

An object of the present invention is to overcome the above as well as other disadvantages in prior bicycle racks or carriers of the indicated character and to provide an improved bicycle rack incorporating improved means for releasably mounting the rack on an exteriorly mounted spare tire on a vehicle and improved means for releasably supporting one or more bicycles on the rack with the bicycles in a fully assembled condition.

Another object of the invention is to provide an improved bicycle rack that may be easily and quickly installed on and removed from an exteriorly mounted vehicle spare tire with a minimum of time, labor and expense, and without requiring the use of wrenches or other tools.

Another object of the invention is to provide an improved bicycle rack which may be easily mounted on an exteriorly mounted spare tire on a vehicle and which may be easily and quickly adjusted to accommodate spare tires of various sizes.

Another object of the present invention is to provide an improved bicycle rack that is relatively simple in construction, economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 3 is a side elevational view of the rack illustrated in FIG. 1;

FIG. 4 is a top plan view of the rack illustrated in FIG. 1;

FIG. 5 is an elevational view of the rack and spare tire illustrated in FIG. 1, and showing a bicycle mounted on the rack;

FIG. 6 is a perspective view of another embodiment of the invention, showing the same installed on an exteriorly mounted spare tire on a vehicle;

FIG. 7 is an elevational view of the rack illustrated in FIG. 6;

FIG. 8 is a sectional view of the structure illustrated in FIG. 7, taken on the line 8—8 thereof;

FIG. 9 is a sectional view of the structure illustrated in FIG. 8, taken on the line 9—9 thereof;

FIG. 10 is a side elevational view of the rack illustrated in FIG. 6;

FIG. 11 is a top plan view of the rack illustrated in FIG. 6; and

FIG. 12 is an elevational view of the rack and spare tire illustrated in FIG. 6, and showing a bicycle mounted on the rack.

DETAILED DESCRIPTION

Figure 1:
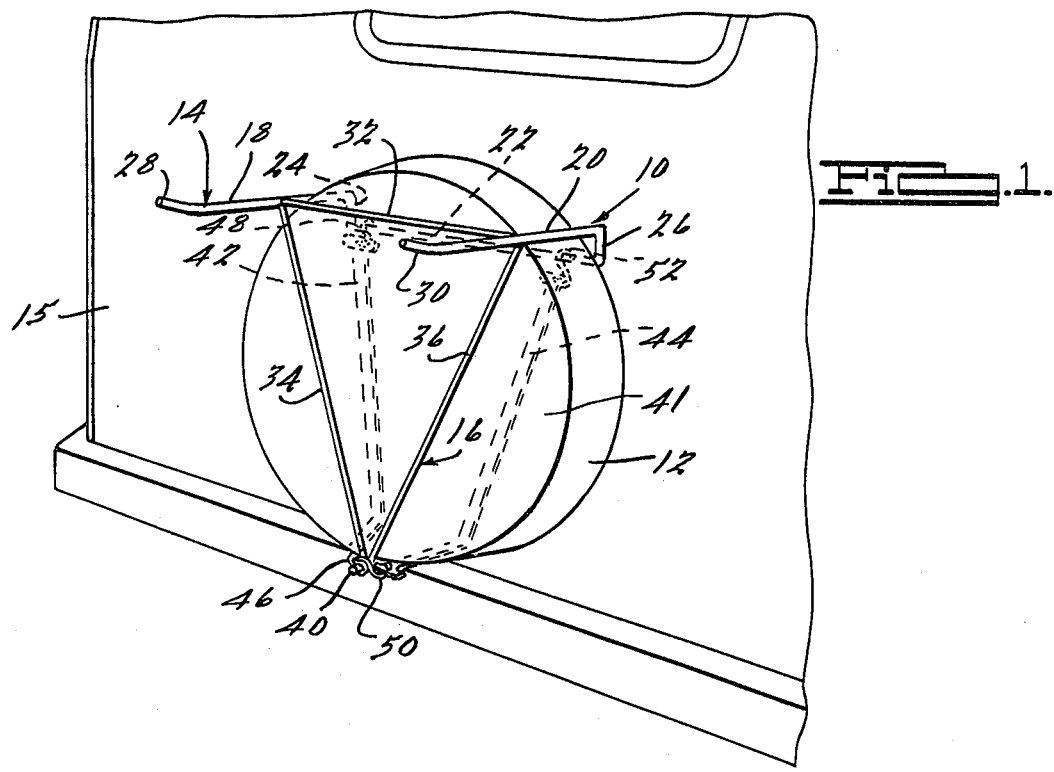
FIG. 1 is a perspective view of a bicycle rack embodying the present invention, showing the same installed on an exteriorly mounted spare tire on a vehicle.
Figure 2:
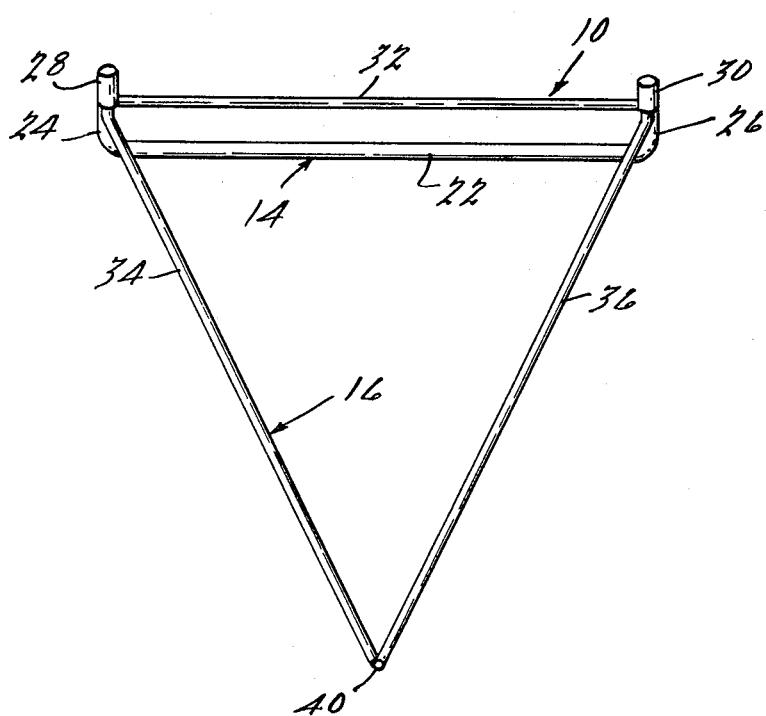
FIG. 2 is an elevational view of the rack illustrated in FIG. 1.

Referring to the drawings, one embodiment of the invention is illustrated in FIGS. 1 through 5 thereof, and is comprised of a bicycle rack, generally designated 10, which is particularly adapted for use in conjunction with an exteriorly mounted spare tire 12 such as is commonly utilized on recreational vehicles, motor homes, van type vehicles and other automotive vehicles, the spare tire 12 being mounted exteriorly on the vehicle 15 by any desired or conventional means (not shown). As shown in the drawings, the rack 10 is comprised of a horizontally disposed support section 14 which is of generally U-shaped configuration, and a vertically disposed base section 16 which is of generally inverted isosceles triangular configuration, the horizontally disposed support section 14 and the vertically disposed base section 16 being integrally joined together to form a unitary structure as will be described hereinafter in greater detail.

The horizontally disposed support section 14 is preferably formed of a single steel rod or other suitable material having sufficient strength to withstand the forces exerted thereon and is bent into the configuration illustrated in the drawings so as to include a pair of laterally spaced, horizontally extending, substantially parallel arms 18 and 20, and a transverse portion 22 which extends between the arms in vertically spaced relationship with respect thereto, the transverse portion 22 being integrally joined to the arms 18 and 20 by vertically extending segments 24 and 26. By way of example, the rod forming the support section 14 may be approximately five-eights inch in diameter, and the transverse portion 22 may be vertically offset from the arms by a distance of approximately two inches. The free end portions 28 and 30 of the arms 18 and 20, respectively, preferably extend angularly upwardly and form abutment stops which limit movement of bicycle frames supported by the arms 18 and 20 as will be described subsequently hereinafter. The total length of each of the arms 18 and 20 may be, for example, approximately twenty-one inches and the distance between the arms may be approximately twenty inches.

The vertically disposed base section 16 of the rack 10 is comprised of a horizontally extending rod 32 and oppositely angularly extending rods 34 and 36 the axes of which are disposed in the same plane as the axis of the rod 32. The rods 32, 34 and 36 are also preferably formed of steel or other suitable material having sufficient strength to withstand the forces exerted thereon and may be approximately one-half inch in diameter. The opposite end portions of the horizontally extending rod 32 are welded or otherwise fixed to the arms 18 and 20 at a position intermediate the ends thereof whereby the rod 32, the vertically offset transverse portion 22, the vertical segments 24 and 26, and the portions of the arms 18 and 20 disposed between the rod 32 and the vertical segments 24 and 26 define an opening 38, the width of the opening being slightly greater than the width of the spare tire with which the rack is to be associated while the length of the opening 38 may be approximately one-half to two-thirds of the maximum diameter of such spare tire whereby the rack 10 may be fitted over the upper end portion of the spare tire as illustrated so that the portions of the arms 18 and 20 disposed between the rod 32 and the vertical segments 24 and 26 engage the periphery of the spare tire, or the tire cover, while the vertical segments 24 and 26 and the transverse portion 22 engage one side wall of the tire and the rod 32 engages the opposite side wall of the spare tire.

The rod 36 extends angularly downwardly to the apex of the triangle defined by the vertical base section 16, and the end portion of the rod 36 adjacent such apex is bent outwardly to form a tang portion 40 the axis of which extends in a direction substantially parallel to the axes of the arms 18 and 20. Such tang portion may be, for example, approximately one inch long. The upper end portion of the rod 36 is welded or otherwise fixed to the arm 20 and the adjacent end of the rod 32 in the area of the junction of the rod 32 with the arm 20 while the lower end portion of the rod 36 adjacent the inner end of the tang portion 40 is welded to the lower end portion of the angularly extending rod 34 and the opposite end portion of the rod 34 is welded to the arm 18 and the rod 32 in the area of the junction of the rod 32 with the arm 18. With such a construction, the support section 14 and the base section 16 are integrally joined together to form a unitary structure. The length of the rods 34 and 36, excluding the tang portion 40, may be slightly less than the maximum diameter of the spare tire.

When the rack 10 is fitted over the upper end portion of the spare tire 12 as illustrated, the vertically disposed base section 16 is situated adjacent the outer wall 41 of the spare tire, or the tire cover, as the case may be, and the rack is retained in such position on the spare tire through the agency of a pair of conventional resilient shock straps 42 and 44, the shock strap 42 having conventional metallic hooks 46 and 48 fitted to the opposite ends thereof while the shock strap 44 has metallic hooks 50 and 52 fitted to the opposite ends thereof. After the rack 10 has been fited over the upper end of the spare tire 12 as illustrated, the hook 46 is engaged with the tang 40 and the shock strap 42 is passed under and up behind the spare tire 12 and the hook 48 engaged with the rod 32. The hook 50 is also engaged with the tang 40 and the shock strap 44 is passed under and up behind the spare tire 12 and the hook 52 engaged with the rod 22 of the rack 10. Such a construction serves to hold the rack 10 firmly on the spare tire 12 in the position illustrated. It will be understood that straps, ropes or other means could also be utilized to hold the rack firmly on the spare tire.

The horizontally disposed portions of the arms 18 and 20 situated between the rod 32 and the abutments 28 and 30 may then be utilized to support the frames of one or more bicycles as illustrated, the frames of the bicycles being secured to the rack 10 or the bumper of the vehicle through the agency of additional shock straps constructed in a manner similar to the manner in which the shock straps 42 and 44 are constructed. In the alternative, straps, ropes or other means may be utilized to secure the bicycles to the rack or bumper.

From the foregoing it will be appreciated that the rack 10 may be easily and quickly mounted on the spare tire 12 without requiring the use of wrenches or other tools, and that the bicycles, in a fully assembled condition, may be easily mounted on and removed from the arms 18 and 20 of the rack 10 with a minimum of time and labor. Also, if desired, the rods which comprise the rack 10 may be coated with plastic or other suitable material to minimize the possibility of scratching or marring the bicycles.

Another embodiment of the invention is illustrated in FIGS. 6 through 12 and is comprised of a bicycle rack, generally designated 110, which is also adapted for use in conjunction with the exteriorly mounted spare tire 12 which, as previously mentioned, is of the type commonly utilized on recreational vehicles, motor homes, van type vehicles and other automotive vehicles, such as the vehicle 15 as previously described. As shown in FIGS. 6 through 12, the rack 110 is comprised of a horizontally disposed support section 114 which is of generally U-shaped configuration, and a vertically disposed base section 116 which is of generally H-shaped configuration. In this embodiment of the invention, the horizontally disposed support section 114 and the vertically disposed base section 116 are releasably and adjustably joined together, as will be described hereinafter in greater detail, whereby the rack 110 may be easily and quickly assembled and/or disassembled, as for storage purposes, without requiring the use of wrenches or other tools, and the rack 110 may also be easily and quickly adjusted to accommodate spare tires of various sizes.

The horizontally disposed support section 114 is preferably formed of steel rod or other suitable material having sufficient strength to withstand the forces exerted thereon and is bent into the configuration illustrated in the drawings so as to include a pair of laterally spaced, horizontally extending, substantially parallel arms 118 and 120, and a transverse portion 122 which extends between the arms in vertically spaced relationship with respect thereto, the transverse portion 122 being integrally joined to the arms 118 and 120 by angularly extending segments 124 and 126. By way of example, the rod forming the support section 114 may be approximately five-eights inch in diameter, and the transverse portion 122 may be vertically offset from the arms by a distance of approximately one inch. The free end portions 128 and 130 of the arms 118 and 120, respectively, preferably extend angularly upwardly and form abutment stops which limit movement of bicycle frames supported by the arms 118 and 120. The total length of each of the arms 118 and 120 may be, for example, approximately twenty-one inches and the distance between the arms may be approximately eighteeen inches.

In this embodiment of the invention, a pair of connector pins 132 and 134 are provided which are fixed to the central sections of the arms 118 and 120, respectively. Each of the connector pins 132 and 134 includes a pair of spaced, horizontally disposed segments 136 and 138 integrally joined by an angularly inclined segment 140. The segments 136 of each of the connector pins 132 and 134 are preferably fillet welded to the adjacent arm 118 or 120, the fillet weld extending completely around the junction of the segment 136 with the associated arm 118 or 120. With such a construction, the segment 138 of each of the connector pins extends in spaced parallel relationship with respect to the associated arm 118 or 120 of the support section 114. The connector pins 132 and 134 are adapted to be received in connector sleeves 142 and 144, respectively, provided on the base section 116 as will be described hereinafter in greater detail.

In this embodiment of the invention, a pair of catch members 146 and 148 are also provided which are welded or otherwise fixed to the arm 118 and 120, respectively, at a position approximately midway between the connector pins 132 and 134 and the transverse portion 122. The catch members 146 and 148 project outwardly from the sides of the arms 118 and 120 and define passageways such as 150 adapted to receive metallic hooks such as 152 and 154 fixed to the opposite ends of a conventional shock strap 156, the shock strap being utilized to releasably secure a bicycle to the rack 110 by passing the shock strap over a suitable portion of the frame of the bicycle and engaging the hooks 152 and 154 in the passageway 150 of the associated catch member 146 or 148.

The vertically disposed, generally H-shaped base section 116 of the rack 110 is comprised of a horizontally extending rod member 158 and a pair of leg members 160 and 162 which are also preferably formed of rods and the axes of which are disposed in the same plane as the axis of the rod member 158. The leg member 160 includes oppositely angularly inclined segments 164 and 166 while the leg member 162 includes oppositely angularly inclined segments 168 and 170. The segments 164 and 168 of the legs 160 and 162, respectively, are preferably formed integrally with the horizontally extending rod member 158 while the lower end portions of the segments 166 and 170 are preferably welded or otherwise fixed to the horizontally extending rod member 158 as illustrated in the drawings. The base section 116 is also preferably formed of steel rods or other suitable material having sufficient strength to withstand the forces exerted thereon. By way of example, the horizontally extending rod member 158 and the segments 164 and 168 of the leg members may be approximately one-half inch in diameter while the segments 166 and 170 may be approximately five-eights inch in diameter.

The connector sleeves 142 and 144 are welded or otherwise fixed to the upper end portions of the segments 166 and 170 of the leg members and are adapted to slidably receive the connector pins 132 and 134. With such a construction, the transverse portion 122, the angularly extending segments 124 and 126, the portions of the arms 118 and 120 disposed between the horizontally extending rod member 158 and the transverse portion 122, and the rod member 158 define an opening 172 adapted to receive the upper end portion of a spare tire. The width of the opening 172 may be adjusted to accommodate tires of various widths by slidinig the connector sleeves 142 and 144 on the associated connecting pins 132 and 134 within the range afforded by the length of the segments 138 of each of the connecting pins. It will be noted that the connecting sleeves are longitudinally offset with respect to the associated leg segments 166 and 170 and, if desired, the base section 116 may be reversed end for end from the position illustrated in the drawings so that the connecting sleeve 144 engages the connecting pin 132 while the connecting sleeve 142 engages the connecting pin 134 so as to further increase the distance between the transverse portion 122 and the horizontally extending rod member 158 to accommodate tires of varying widths. By way of example, the base section 116 may be adjusted relative to the horizontally disposed support section 114 whereby the distance between the transverse portion 122 and the horizontally extending rod member 158 may be adjusted to accommodate tires having a width in the range between six inches and nine inches. The length of the opening 172 may be approximately one-half to two-thirds of the maximum diameter of the spare tire whereby the rack 110 may be fitted over the upper end portion of the spare tire as illustrated in the drawings so that the portions of the arms 118 and 120 disposed between the transverse portion 122 and the horizontally extending rod member 158 of the base section engage the periphery of the spare tire, or the tire cover, while the segments 124 and 126 and the transverse portion 122 engage one side wall of the tire and the horizontally extending rod member 158 engages the opposite side wall of the tire. In this embodiment of the invention, a pair of catch members 174 and 176 are also provided which are welded or otherwise fixed to the segments 164 and 168 adjacent the free ends thereof. The catch members 174 and 176 define passageways, such as 178, adapted to receive metallic hooks, such as 180 and 182, fixed to conventional shock straps.

When the rack 110 is fitted over the upper end portion of the spare tire as illustrated in the drawings, the vertically disposed base section 116 is situated adjacent the outer wall of the spare tire, or tire cover, as the case may be, and the rack 110 is retained in such position on the spare tire though the agency of conventional resilient shock straps having conventional metallic hooks fitted to the opposite ends thereof, the hooks on the lower end portions of the shock straps engaging the catch members 180 and 182 with the shock straps passing under and crossing up behind the spare tire 12 so that the metallic hooks at the opposite ends of the shock straps may be engaged with the transverse portion 122 of the horizontally disposed support section 114. Such a construction serves to hold the rack 110 firmly on the spare tire in the position illustrated in FIGS. 6 and 12 of the drawings. It will be understood, however, that straps, ropes or other means may also be utilized to hold the rack 110 firmly on the spare tire.

The horizontally disposed portions of the arms 118 and 120 extending outwardly beyond the base section 116 may then be utilized to support the frames of one or more bicycles as illustrated in FIG. 12, the frames of the bicycles being secured to the rack 110 or the bumper of the vehicle through the agency of shock straps having metallic hook portions such as 152 and 154 at the opposite ends thereof engageable with the catch members 146 and 148 in the manner previously described. In the alternative, straps, ropes or other means may also be utilized to secure the bicycles to the rack 110.

From the foregoing, it will be appreciated that the rack 110 may be easily and quickly assembled and disassembled and may be easily and quickly mounted on the spare tire without requiring the use of wrenches or other tools, and that bicycles in a fully assembled condition may be easily mounted on and removed from the arms 118 and 120 of the rack 110 with a minimum of time and labor. Also, if desired, the components of the rack 110 may be coated with plastic or other suitable material to minimize the possibility of scratching or marring the bicycles.

While preferred embodiments of the invention have been illustrated and described, it will be understood that various changes and modifications may be made without departing from the spirit of the invention.

What is claimed is:

1. A bicycle rack particularly adapted for use with an exteriorly mounted spare tire on an automotive vehicle, said rack comprising, in combination, a horizontally disposed support section and a vertically disposed base section, means connecting said support section and said base section together, said support section being of generally U-shaped configuration and including a pair of laterally spaced, horizontally extending arms and a transverse portion extending between said arms in vertically spaced relationship with respect thereto, said base section including a horizontally extending member disposed in horizontally spaced relationship with respect to said transverse portion of said support section whereby a portion of a tire may be received therebetween, said base section also including a pair of oppositely angularly disposed members each having one end portion thereof connected to said support section.

2. The combination as set forth in claim 1, the free end portions of said arms extending angularly upwardly to form abutment stops.

3. The combination as set forth in claim 1 including resilient means for releasably securing said rack to a spare tire.

4. The combination as set forth in claim 1, said arms and said transverse portion of said support section being formed of a single cylindrical rod.

5. The combination as set forth in claim 4, said base section being formed of additional cylindrical rods including rods having a diameter less than the diameter of said single rod.

6. The combination as set forth in claim 1 including means for releasably securing a bicycle to said support section.

7. The combination as set forth in claim 1, said base section be releasably connected to said support section.

8. The combination as set forth in claim 1, said base section being integrally joined to said support section.

9. A bicycle rack particularly adapted for use with an exteriorly mounted spare tire on an automotive vehicle, said bicycle rack comprising, in combination, a horizontally disposed support section and a vertically disposed base section, means connecting said support section and said base section together, said support section being of generally U-shaped configuration and including a pair of laterally spaced, horizontally extending, substantially parallel arms and a transverse portion extending between said arms in vertically spaced relationship with respect thereto, said transverse portion being integrally joined to said arms by integral segments, said base section including a horizontally extending member disposed in horizontally and vertically spaced relationship with respect to said transverse portion of said support section whereby said support section and said base section define an opening spaced from the free ends of said arms and adapted to receive a portion of a tire, said base section also including a pair of oppositely angularly disposed members each having one end portion thereof connected to said support section.

10. The combination as set forth in claim 9, the free end portions of said arms extending angularly upwardly to form abutment stops.

11. The combination as set forth in claim 9, said base section being releasably connected to said support section.

12. The combination as set forth in claim 9, said base section being integrally joined to said support section.

13. In combination with an exteriorly mounted spare tire on an automotive vehicle, a bicycle rack including a horizontally disposed support section and a vertically disposed base section, means connecting said support section and said base section together, said support section being of generally U-shaped configuration and including a pair of laterally spaced, horizontally extending, substantially parallel arms and a transverse portion extending between said arms in vertically spaced relationship with respect thereto, said transverse portion being joined to said arms by integral segments, said base section including a horizontally extending member disposed in horizontally and vertically spaced relationship with respect to said transverse portion of said support section whereby said support section and said base section define an opening spaced from the free ends of said arms and adapted to receive a portion of said spare tire, said base section also including a pair of oppositely angularly disposed members each having one end portion thereof connected to said support section.

14. The combination as set forth in claim 13, said base section being of generally inverted isosceles triangular configuration.

15. The combination as set forth in claim 13, said base section being of generally H-shaped configuration.

16. The combination as set forth in claim 13, the free end portions of said arms extending angularly upwardly to form abutment stops.

17. The combination as set forth in claim 13, the length of said horizontally extending member being approximately one-half to two-thirds the maximum diameter of said spare tire.

18. The combination as set forth in claim 13, the length of said angularly disposed members being less than the maximum diameter of said spare tire.

19. The combination as set forth in claim 13 including resilient means connected to said support section and said base section to hold said rack firmly on said spare tire.

20. The combination as set foprth in claim 13, said arms and said transverse portion of said support section being formed of a single cylindrical rod.

21. The combination as set forth in claim 13, said base section being releasably and adjustably connected to said support section.

22. The combination as set forth in claim 13, said base section being integrally joined to said support section.

* * * * *